United States Patent
Lee et al.

(10) Patent No.: US 10,019,064 B2
(45) Date of Patent: Jul. 10, 2018

(54) USER INTERFACE DEVICE FOR PROVIDING FORCE FEEDBACK ACCORDING TO INTERACTION WITH VIRTUAL OBJECT OR USER AT REMOTE PLACE

(71) Applicant: Center of Human-centered Interaction for Coexistence, Seoul (KR)

(72) Inventors: Kwang Kyu Lee, Yongin-si (KR); Shin Young Kim, Seoul (KR); Dae Keun Yoon, Seoul (KR); Bum Jae You, Seoul (KR)

(73) Assignee: Center of Human-centered Interaction for Coexistence, Seoul (KR)

( * ) Notice: Subject to any disclaimer, the term of this patent is extended or adjusted under 35 U.S.C. 154(b) by 56 days.

(21) Appl. No.: 15/233,571

(22) Filed: Aug. 10, 2016

(65) Prior Publication Data

US 2017/0045943 A1 Feb. 16, 2017

(30) Foreign Application Priority Data

Aug. 12, 2015 (KR) ........................ 10-2015-0114134

(51) Int. Cl.
| | | |
|---|---|---|
| *G06F 3/01* | (2006.01) | |
| *G06F 3/03* | (2006.01) | |
| *G06F 3/0346* | (2013.01) | |
| *G06F 3/038* | (2013.01) | |
| *G06F 3/0354* | (2013.01) | |

(52) U.S. Cl.
CPC ............ *G06F 3/016* (2013.01); *G06F 3/0304* (2013.01); *G06F 3/0346* (2013.01); *G06F 3/0386* (2013.01); *G06F 3/03545* (2013.01); *G06F 2203/0384* (2013.01)

(58) Field of Classification Search
CPC .... G06F 3/016; G06F 3/03545; G06F 3/0346; G06F 3/0304; G06F 3/0386; G06F 2203/0384
See application file for complete search history.

(56) References Cited

U.S. PATENT DOCUMENTS

| | | | | |
|---|---|---|---|---|
| 2013/0328770 A1* | 12/2013 | Parham | ................. | G06F 3/0304 345/157 |
| 2014/0118315 A1* | 5/2014 | Black | ................. | G06F 3/03545 345/179 |
| 2015/0309575 A1* | 10/2015 | Jiang | ..................... | G06F 3/0488 345/179 |
| 2015/0323995 A1* | 11/2015 | Lim | ..................... | G06F 3/0416 345/174 |
| 2016/0109967 A1* | 4/2016 | Craig | ................. | G06F 3/03545 345/179 |

\* cited by examiner

*Primary Examiner* — Ryan A Lubit
(74) *Attorney, Agent, or Firm* — Novick, Kim & Lee, PLLC; Sang Ho Lee

(57) ABSTRACT

Provided is a hand-held type user interface device for providing force feedback to a user according to an interaction with a virtual object or a user at a remote place, which remarkably increases the sense of reality in the interaction with the virtual object without limiting an action of the user by sensing the three-dimensional (3D) position and direction of the device and diversifying a force feedback provided to the user according to an action of the user holding the device.

10 Claims, 3 Drawing Sheets

USER INTERFACE DEVICE FOR PROVIDING FORCE FEEDBACK ACCORDING TO INTERACTION WITH VIRTUAL OBJECT OR USER AT REMOTE PLACE

CROSS-REFERENCE TO RELATED APPLICATION

This application claims priority to and the benefit of Korean Patent Application No. 10-2015-0114134, filed on Aug. 12, 2015, the disclosure of which is incorporated herein by reference in its entirety.

BACKGROUND

1. Field of the Invention

The present invention relates to a user interface device for providing force feedback according to an interaction with a virtual object or a user at a remote place, and more particularly, to a user interface device for providing force feedback according to an interaction with a virtual object or a user at a remote place which provides force feedback to a user's hand holding the device according to the magnitude and the three-dimensional (3D) direction of the force pressing a virtual object or an image corresponding to the user at a remote place.

2. Discussion of Related Art

These days, various technologies are being proposed for providing a higher satisfaction to a user through a user interface during using a device. Haptic feedback provided through a device in various forms is such a technology.

According to the haptic feedback technology, vibrations are mainly used to provide a sense of touch to a user. Such vibration-based haptic feedback is frequently used in mobile devices including a cellular phone, a tablet personal computer (PC), a portable multimedia player (PMP), a personal digital assistant (PDA), a Motion Picture Experts Group (MPEG) audio layer 3 (MP3) player, and so on.

Meanwhile, research is currently underway for applying to virtual reality delivery of real world force feedback. Since a virtual object existing in virtual reality is not an actual object, to make a user feel the virtual object as if it is an actual object when attempting to touch the virtual object is very difficult. It is currently difficult even to precisely provide feedback to the user when a contact point with the virtual object is changed or there is a change in force virtually exerted on the virtual object. Also, in case of an interaction with a user at a remote place, it is currently difficult to give the user a feeling of interacting with an actual person.

Therefore, the present applicant has developed a technology for interacting with a virtual object very conveniently and providing a very realistic resultant feeling.

SUMMARY OF THE INVENTION

The present invention is directed to solve all the problems mentioned above.

The present invention is also directed to providing realistic virtual force generated by an interaction with a user at a remote place or a virtual object through a device.

According to an aspect of the present invention, there is provided a user interface device for providing force feedback to a user according to interaction with a virtual object or a user at a remote place, the user interface device including: a body formed to have a lengthwise direction and having a fastening means for fastening the user's hand; a first infrared (IR) generator located in a first stage of the body and configured to generate interaction-purpose IR rays for pointing at an arbitrary point of the virtual object or interacting with the user at the remote place; a sensor configured to sense the lengthwise direction of the body in three-dimensional (3D) space; a power generator configured to acquire a power generation signal corresponding to a direction of force with reference to the lengthwise direction of the body and generate power when information on the direction of the force exerted by the user on the virtual object or the user at the remote place is acquired and information on the lengthwise direction of the body is acquired through the sensor while the interaction-purpose IR rays point at the arbitrary point of the virtual object or a predetermined region of an image corresponding to the user at the remote place; and a force feedback provider configured to provide force feedback to the user according to the power generated by the power generator.

According to other aspects of the present invention, there are also provided a method, an apparatus, and a system for implementing the present invention, and a computer-readable recording medium for storing a computer program for performing the method.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

The following detailed description of the present invention refers to the accompanying drawings that illustrate exemplary embodiments consistent with the present invention. The embodiments will be sufficiently described in detail such that the present invention is implementable by those of ordinary skill in the art. It should be understood that various embodiments of the present invention differ from each other but do not need to be mutually exclusive. For example, specific shapes, structures and features disclosed herein for one embodiment may be differently implemented in another embodiment without departing from the spirit and scope of the present invention. In addition, it should be understood that positions or a disposition of respective constituents in each illustrated embodiment can be changed without departing from the spirit and scope of the present invention. Therefore, the detailed description given below is not intended to limit the present invention, the scope of which is defined, when properly described, only in the claims and their equivalents. Wherever possible, like reference numbers will be used throughout the drawings to refer to the same or like parts.

Hereinafter, the exemplary embodiments of the present invention will be described in detail with reference to the accompanying drawings to allow those of ordinary skill in the art to readily implement the present invention.

Figure 1:
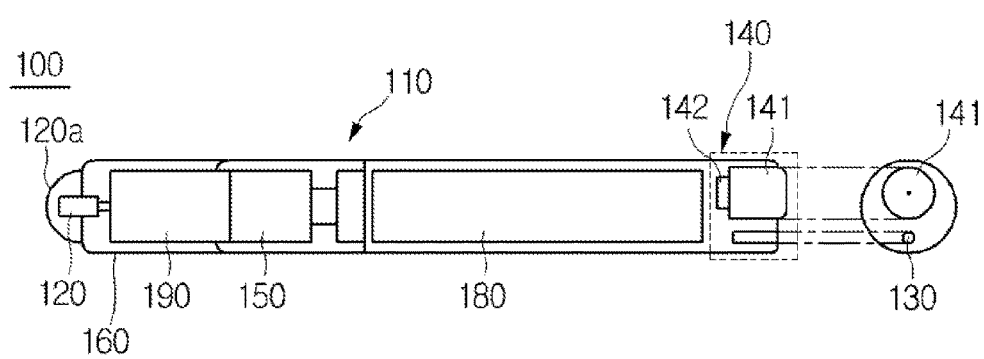
FIG. 1 is a side cross-section view of a user interface device for providing force feedback corresponding to pointing at a virtual object according to an exemplary embodiment of the present invention.

FIG. 1 shows an internal configuration of a user interface device for providing force feedback to a user corresponding to pointing at a virtual object according to an exemplary embodiment of the present invention.

As shown in FIG. 1, a user interface device 100 is in the shape of a pen having a lengthwise direction so that a user can hold the user interface device 100 in hand and point at an object.

Therefore, when the user points the user interface device 100 at a point in space occupied by a virtual object and presses the user interface device 100 while holding the user interface device 100 in hand, infrared (IR) rays emitted to the point by the user interface device 100 are sensed by a predetermined IR camera, etc., and power is generated to correspond to a direction and magnitude of force corresponding to a trajectory corresponding to a change in the point at which the IR rays are sensed so that force feedback is provided to the user's hand.

To this end, the user interface device 100 according to an exemplary embodiment of the present invention includes a body 110, a first IR generator 120, a second IR generator 130, a sensor (not shown) including an inertial measurement unit (IMU) sensor, etc., a laser pointer generator 140, a power generator 150, and a force feedback provider 160. However, the second IR generator 130, the laser pointer generator 140, etc. are not necessarily included. Also, the user interface device 100 according to the exemplary embodiment of the present invention may additionally include a mainboard 180, a battery 190, and so on.

The body 110 may be configured as a cylindrical housing, and the mainboard 180 for causing each component module to operate as a circuit may be installed in the body 110.

As mentioned above, the body 110 is in the shape of a pen having a lengthwise direction (but is not limited to the shape of a pen). The first IR generator 120 for pointing at a virtual object may be located in the first stage (i.e., the leftmost portion in FIG. 1) of the body 110 so that the user feels like writing characters on a virtual surface with a writing tool or pressing the virtual object. Note that although FIG. 1 shows that the force feedback provider 160 is located in the first stage of the body 110 and the first IR generator 120 is located at one end of the force feedback provider 160, the first IR generator 120 can be located in the first stage of the body taking into consideration that the force feedback provider 160 is a component which can move on the body 110.

The first IR generator 120 may be an IR light-emitting diode (LED) which generates IR rays and is supplied with electric power from the battery 190 included in the body 110 for operation. IR rays generated by the first IR generator 120 may also be referred to as "interaction-purpose IR rays" below.

The first IR generator 120 may be surrounded by a cap 120a. When the cap 120a comes in contact with an arbitrary point of the virtual object, the contact point may be recognized as the target of pointing.

Meanwhile, the sensor (not shown) may be installed in the user interface device 100 and embodied to include the IMU sensor and so on. To solve the problem of drift of the sensor, the second IR generator 130 may be installed to provide an auxiliary support.

The second IR generator 130 may be located in a second stage (i.e., a rightmost portion in FIG. 1) of the body 110 and is similarly supplied with electric power from the battery 190 included in the body 110 for operation. The second IR generator 130 is not necessarily located in the second stage. Also, the battery 190 may be divided into a plurality of batteries and located at separate positions, but FIG. 1 is on the assumption that the user interface device 100 is embodied with a single battery. Meanwhile, IR rays generated by the second IR generator 130 may also be referred to as "IR rays for supporting direction setting" below. Note that when the position of the IR rays generated by the second IR generator 130 is sensed together with the position of the IR rays generated by the first IR generator 120, it is possible to estimate the direction of the user interface device 100 with reference to an imaginary straight line connecting the two positions. Therefore, the IR rays generated by the second IR generator 130 may be referred to as the "IR rays for supporting direction setting."

The laser pointer generator 140 is also supplied with electric power from the battery 190 included in the body 110 for operation and may remotely perform a function of pointing at a virtual object using IR rays.

In other words, the laser pointer generator 140 which is a predetermined distance or more away from the virtual object generates IR rays for remote interaction so that the IR rays are applied to an arbitrary point of the virtual object. At this point, while the laser pointer generator 140 operates and remotely points at the virtual object, switches may be turned off so that the first IR generator 120 and the second IR generator 130 do not operate. Note that the laser pointer generator 140 may include an IR laser pointer lens 141 and an IR laser pointer diode 142 as shown in FIG. 1. Detailed descriptions thereof will be omitted.

The power generator 150 receives a power generation signal transmitted to the body 110 and generates power so that force is applied with a magnitude and a direction according to the power generation signal.

Here, the direction of the force of the power generation signal may be divided into the lengthwise direction of the body 110 and a three-dimensional (3D) direction perpendicular to the lengthwise direction, and the power generator 150 may be a motor having three degrees of freedom to generate the corresponding power.

The power generated by the power generator 150 causes the force feedback provider 160 to operate.

The force feedback provider 160 is moved by the power generated by the power generator 150, thereby providing force feedback to the user's hand holding the body 110.

More specifically, when the user's palm is in contact with the body 110 and fingers surround the force feedback provider 160 to hold it, only the force feedback provider 160 is moved while the palm in contact with the body 110 is fastened, so that force feedback can be provided to the fingers.

At this time, the power generated by the power generator 150 may be simultaneously generated in the lengthwise direction of the body 110 and the 3D direction perpendicular to the lengthwise direction. Therefore, the force feedback provider 160 may include a lateral mover 160 and a perpendicular mover (not shown) to operate according to the directions. Note that FIG. 1, etc. are on the assumption that only the lateral mover 160 moves one-dimensionally for convenience of description.

In order to provide force feedback according to power generated in the lengthwise direction of the body 110, the lateral mover 160 may be coupled to the body 110 to be movable along the lengthwise direction of the body 110. Therefore, every time power is generated in the lengthwise direction, the lateral mover 160 may move according to the power by as much as a stroke of a predetermined range in a direction opposite to a direction in which the user exerts force on the object.

In order to provide force feedback according to power generated in the 3D direction perpendicular to the lengthwise direction of the body 110, the perpendicular mover is coupled to the body 110 to be movable perpendicularly to the lengthwise direction of the body 110.

In particular, the perpendicular mover may be located on the lateral mover 160 so that force can be received not only in the lengthwise direction but also in the 3D direction perpendicular to the lengthwise direction.

Therefore, every time power is generated in the 3D direction perpendicular to the lengthwise direction, the perpendicular mover moves according to the power in a certain 3D direction perpendicular to the lengthwise direction of the body 110. Since force exerted on the perpendicular mover is not strong compared to force exerted on the lateral mover 160, the perpendicular mover may be in the shape of a button so that force feedback of the level of tapping fingers is provided.

Figure 2:
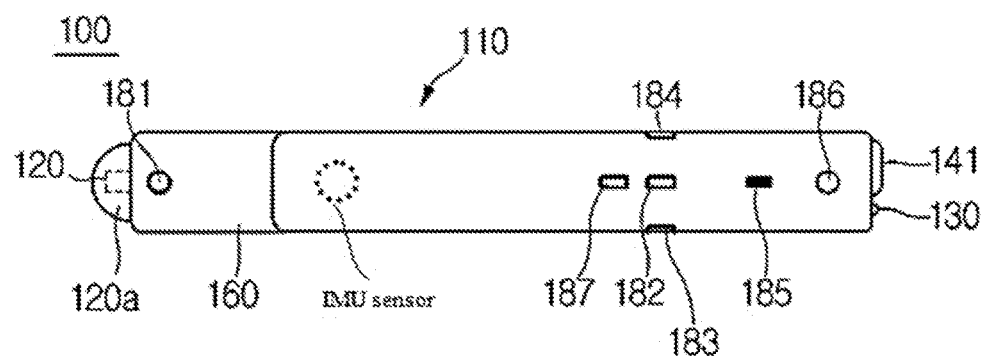
FIG. 2 is a side view of the user interface device for providing force feedback corresponding to pointing at a virtual object according to the exemplary embodiment of the present invention.

In addition, as shown in FIG. 2, the body 110 may have switches 182, 183, 184, and 187 for respectively turning on or off the circuit power, the first IR generator 120, the second IR generator 130, and the laser pointer generator 140 at predetermined positions in the outer surface thereof. It is self-evident that the positions of the switches 182, 183, 184, and 187 may be changed.

Further, to indicate a power state of the circuitry and operational states of the first IR generator 120, the second IR generator 130, the laser pointer generator 140, and other modules, operational state indicators 181, 185, and 186 whose lamps are turned on or off may be located at positions adjacent to the corresponding modules on the outer surface of the body 110. It is self-evident that the positions of the operational state indicator 181, 185, and 186 may be changed.

Moreover, the body 110 may be provided with a fastening means 170 for fastening the user's hand to the body 110 of the user interface device 100. This will be described with reference to FIG. 3.

Figure 3:
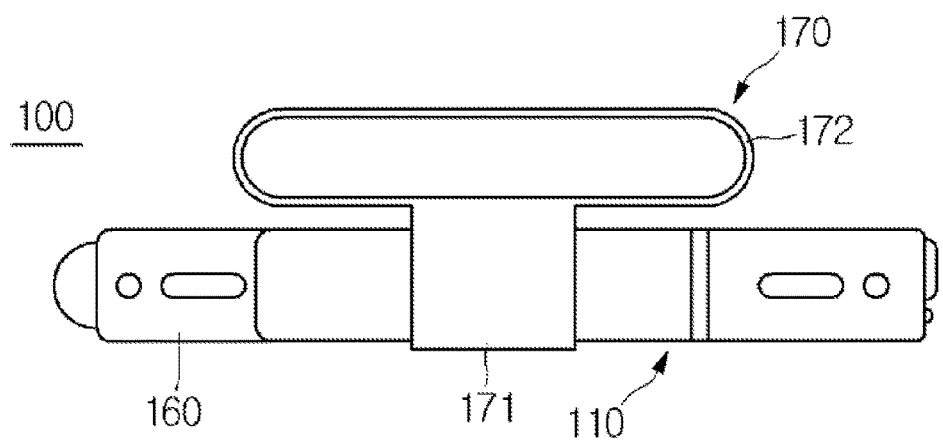
FIG. 3 is a side view of the user interface device equipped with a fastening means according to the exemplary embodiment of the present invention.

Referring to FIG. 3, a state in which the fastening means 170 is coupled to the body 110 is shown. However, the fastening means 170 may be integrally formed with the body 110.

The fastening means 170 includes a body coupler 171 which is formed in a cylindrical shape to be in a surface contact with the body 110 along the lengthwise direction and a hand fastener 172 which is formed in an O-ring shape into which a hand can be inserted.

The body coupler 171 and the hand fastener 172 are not limited to the aforementioned shapes and may have loop shapes as long as each of the body 110 and a hand can be fastened.

The body coupler 171 and the hand fastener 172 may be formed integrally or separately and may be formed of an elastic material such as rubber or silicon to firmly come into a surface contact with the body 110 and a hand and to be readily separated.

Alternatively, the fastening means 170 may be integrally formed with the body 110 so that the body coupler 171 is firmly fastened to the body 110. In this case, the hand fastener 172 may be in a loop shape for giving the feeling of gripping the handle of a gun so that the user's hand holding the body 110 is fastened against the direction of force of force feedback provided by the force feedback provider 160.

Therefore, with the user's hand inserted in the body coupler 171 of the fastening means 170 attached to the body 110, the user makes a pinch grip on the force feedback provider 160 with the fingers.

Next, FIG. 4 shows an example of interacting with a virtual object 200 using the user interface device 100. Note that although an example of interacting with a user at a remote place using the user interface device 100 is not shown, the example of FIG. 4 can be similarly applied to the case.

Figure 4A:
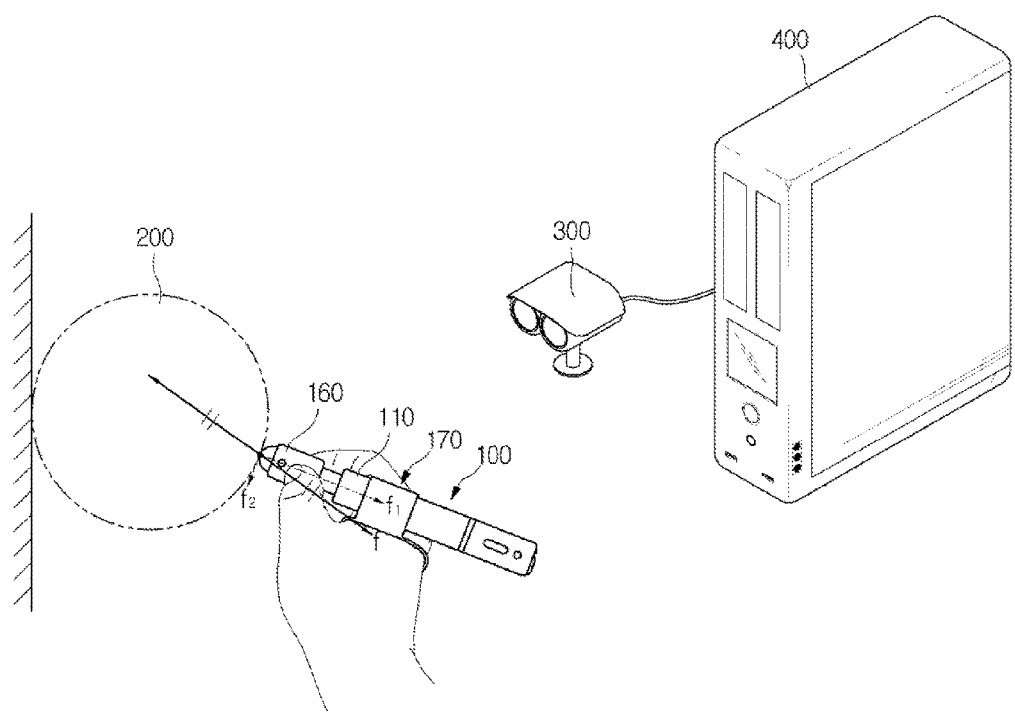
FIG. 4A is an example diagram of a state in which a user applies force to point at a virtual object with the user interface device according to the exemplary embodiment of the present invention.

As shown in FIG. 4A, by touching the virtual object 200 with the first IR generator 120 and while the interaction-purpose IR rays point at an arbitrary point of the virtual object 200, it is possible to acquire information on the direction of force exerted on the virtual object 200 by the user with reference to sensing information of a trajectory, etc. of interaction-purpose IR rays generated by the first IR generator 120. It is also possible to acquire information on the direction of force from something other than the sensing information of the trace. Also, when information on the lengthwise direction of the body 110 is acquired through the sensor (not shown) (in addition, the information on the lengthwise direction of the body 110 can be corrected more accurately with reference to sensing information of the interaction-purpose IR rays and the IR rays for supporting direction setting and acquired), it is possible to acquire a power generation signal corresponding to the direction of the force with reference to the lengthwise direction of the body 110 and cause the power generator 150 to generate power. It is also possible to acquire information on the magnitude of the force exerted on the virtual object 200 by the user as well as information on the direction of the force with reference to sensing information of the trajectory, etc. of the interaction-purpose IR rays generated by the first IR generator 120. In this case, when the information on the lengthwise direction of the body 110 is acquired, the power generator 150 may acquire a power generation signal corresponding to the direction and the magnitude of the force based on the lengthwise direction of the body 110.

Note that a position and a trajectory of the IR rays generated by the first IR generator 120 and/or the second IR generator 130 are sensed by an IR camera 300, and an external device 400 acquires the information on the direction and the magnitude of the force through sensing information acquired by the IR camera 300.

Here, the IR camera 300 sensing the IR rays is a stereo IR camera for sensing IR rays generated from at least one of the first IR generator 120 and the second IR generator 130 and is connected to the external device 400 in a wired or wireless manner to transfer the acquired sensing information to the external device 400.

Specifically, the external device 400 may acquire the direction of force exerted on the virtual object 200 more accurately with reference to the sensing information of the interaction-purpose IR rays and the IR rays for supporting direction setting received from the IR camera 300, divide force in a direction opposite to the direction of the force exerted on the virtual object 200 (i.e., the direction of force exerted on the user by the user interface device 100) into force f1 in the lengthwise direction of the body 110 and force f2 in a 3D direction perpendicular to the lengthwise direction, and generate the corresponding power generation signal.

At this time, the lengthwise direction of can be acquired with reference to information on the angle between the lengthwise direction of the body 110 and the direction of an imaginary line between two points at which IR rays generated by the first IR generator 120 and the second IR generator 130 located in the body 110 are sensed. Such angle information may be stored in advance and managed.

As mentioned above, with reference to the sensing information acquired by the sensor (not shown), it is possible to divide the force in the direction opposite to the direction of the force exerted on the virtual object 200 into the force f1 in the lengthwise direction of the body 110 and the force f2 in a 3D direction perpendicular to the lengthwise direction and generate the corresponding power generation signal by default.

Meanwhile, the power generation signal generated by the external device 400 may be transmitted to a central processing unit (CPU) in the mainboard 180 through a communication unit (not shown) of the user interface device 100, and the CPU may cause the power generator 150 to operate with reference to the power generation signal.

To this end, when the user interface device 100 and the external device 400 are paired through Bluetooth communication, the communications unit of the user interface device 100 may receive the power generation signal.

Figure 4B:
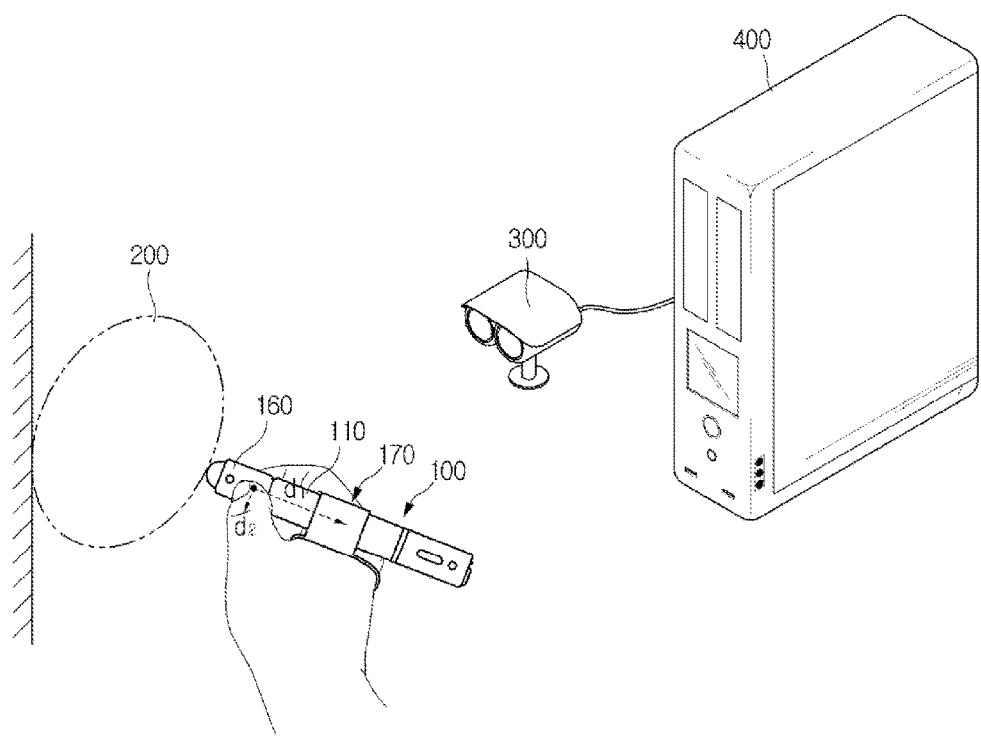
FIG. 4B is an example diagram of a state in which the user interface device operates according to power resulting from the state of FIG. 4A.

The power generator 150 transmits power to the lateral mover of the force feedback provider 160 according to a signal component of the power generation signal corresponding to the lengthwise direction, and thus as shown in FIG. 4B, the lateral mover moves by as much as a stroke of a lateral distance d1 in the lengthwise direction of the body 110.

At the same time, the power generator 150 transmits power to the perpendicular mover of the force feedback provider 160 according to a signal component of the power generation signal corresponding to the 3D direction perpendicular to the lengthwise direction, and thus the perpendicular mover moves by a perpendicular distance d2 in the direction perpendicular to the lengthwise direction of the body 110.

Although not shown in the drawings, delivery of force feedback in which the magnitude and the direction of force is considered may also be enabled for remote pointing through the laser pointer generator 140, but the present invention is not limited thereto.

Also, when the laser pointer generator 140 points at a virtual object, the second stage of the body 110 serves as a writing part of the aforementioned writing tool, and by holding the user interface device 100 upside down, it is possible to use the user interface device 100 with the second stage directed to the virtual object.

According to an exemplary embodiment of the present invention, a reaction force is distributed to the back, the palm, etc. of a user's hand, and force feedback is provided to fingertips so that force feedback can be provided in a hand-held manner. On the other hand, a ground-fixed force feedback device according to related art has a large size for distributing a reaction force when directly transmitting force to a user's hand, and a hand-held force feedback device which can be held and used in a hand is limited to transmission of vibration rather than force.

Exemplary embodiments of the present invention described above may be embodied in the form of program instructions executable by various computing tools and recorded in a computer-readable recording medium. The computer-readable recording medium may include program instructions, data files, data structures, etc., solely or in combination. The program instructions recorded in the computer-readable recording medium may be specially designed or configured for the present disclosure or may be known to and used by those of ordinary skill in the computer software art. Examples of the computer-readable recording medium include magnetic media such as a hard disk, a floppy disk, and a magnetic tape, optical media such as a compact disc read-only memory (CD-ROM) and a digital versatile disc (DVD), magneto-optical media such as an floptical disk, and hardware devices such as a ROM, a random access memory (RAM), a flash memory, etc., specially configured to store and execute the program instructions. Examples of the program instructions include a high-level language code executable by a computer using an interpreter, etc. as well as a machine language code created by a compiler. The hardware devices may be configured to operate as one or more software modules to perform operations according to the present invention, and vice versa.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A user interface device for providing force feedback to a user according to an interaction with a virtual object or a user at a remote place, the user interface device comprising:
   a body elongated in a lengthwise direction and having an inertial measurement unit (IMU) sensor;
   a first infrared (IR) generator located in a first portion of the body and configured to generate first IR rays pointing at an arbitrary point of the virtual object or interacting with the user at the remote place;
   a force feedback provider providing the force;
   a power generator configured to acquire a power generation signal corresponding to a direction and a magnitude of a user's force with respect to the lengthwise direction of the body and generate a movement of the force feedback provider in response to the power generation signal when information of the direction and the magnitude of the user's force with respect to the virtual object or the user at the remote place is acquired, and a change of an orientation of the lengthwise direction is obtained by using data from the IMU sensor or by using an external IR camera while the first IR rays point at the arbitrary point of the virtual object or a predetermined region of an image corresponding to the user at the remote place; and
   a second infrared (IR) generator to correct a misalignment of the IMU sensor relative to the lengthwise direction.

2. The user interface device of claim 1, wherein the information of the direction and the magnitude of the user's force with respect to the virtual object or the user at the remote place is acquired with reference to sensing information of a trajectory of the first IR rays.

3. The user interface device of claim 1, wherein the second IR generator is disposed at a second portion of the body and configured to generate second IR rays in opposite direction from the first IR rays,
  wherein information of the orientation of the lengthwise direction is corrected with reference to direction information of an imaginary line between the first IR rays and the second IR rays which is sensed by the external IR camera.

4. The user interface device of claim 3, wherein the power generation signal is acquired by an external device connected to the external IR camera in a wired or wireless manner,
  and wherein the user interface device is configured to receive the power generation signal while paired with the external device.

5. The user interface device of claim 3, wherein the lengthwise direction of the body is acquired from the direction information of the imaginary line between the first IR rays and the second IR rays which are sensed by the external IR camera with reference to angle information between the lengthwise direction of the body and the direction information of the imaginary line.

6. The user interface device of claim 1, further comprising an IR laser generator coupled to a predetermined position in the body and configured to generate an IR laser for a remote interaction, wherein the IR laser is applied to the arbitrary point of the virtual object or the predetermined region of the image corresponding to the user at the remote place, and wherein the IR laser generator emits the IR laser for remote interaction to the virtual object or the image corresponding to the user at the remote place while being apart from the virtual object or the image corresponding to the user at the remote place.

7. The user interface device of claim 1, wherein the force feedback provider includes a perpendicular mover coupled to the body to be movable in a three dimensional (3D) direction perpendicular to the lengthwise direction of the body.

8. The user interface device of claim 1, wherein the force feedback provider includes a lateral mover coupled to the body to be movable in a parallel to the lengthwise direction of the body.

9. The user interface device of claim 1, wherein the body further has an operational state indicator configured to turn on or off a lamp at a predetermined position on an outer surface of the body indicating whether or not the first IR generator operates.

10. The user interface device of claim 1, wherein the user interface device comprises a fastener, and the fastener includes:
  a body coupler integrally connected with the body or fastened to the body to be removable; and
  a hand fastener.

* * * * *